United States Patent
Sasaoka et al.

(10) Patent No.: US 9,495,077 B2
(45) Date of Patent: Nov. 15, 2016

(54) DISPLAY DEVICE, DISPLAY METHOD, AND NON-TRANSITORY COMPUTER-READABLE RECORDING MEDIUM

(75) Inventors: Takayoshi Sasaoka, Osaka (JP); Akihiro Azuma, Osaka (JP); Mitsukuni Tanya, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 185 days.

(21) Appl. No.: 14/113,536

(22) PCT Filed: Apr. 18, 2012

(86) PCT No.: PCT/JP2012/060434
§ 371 (c)(1),
(2), (4) Date: Oct. 23, 2013

(87) PCT Pub. No.: WO2012/147579
PCT Pub. Date: Nov. 1, 2012

(65) Prior Publication Data
US 2014/0096079 A1    Apr. 3, 2014

(30) Foreign Application Priority Data

Apr. 26, 2011 (JP) .................................. 2011-098438

(51) Int. Cl.
*G06F 3/048* (2013.01)
*G06F 3/0482* (2013.01)
(Continued)

(52) U.S. Cl.
CPC ............. *G06F 3/0482* (2013.01); *G06Q 10/10* (2013.01); *G06F 15/02* (2013.01)

(58) Field of Classification Search
CPC .................. G06F 3/0482; G06F 15/02; G06Q 10/10
(Continued)

(56) References Cited

U.S. PATENT DOCUMENTS 5,697,793 A * 12/1997 Huffman ............. G06F 15/0283
434/156
6,640,655 B1    11/2003 Manzak et al.
(Continued)

FOREIGN PATENT DOCUMENTS

CN    1735856 A    2/2006
JP    2003-150618 A    5/2003
(Continued)

OTHER PUBLICATIONS

ComicRack, taken from http://comicrack.cyolito.com/forum/8-help/15354-coluored-numbers, published Apr. 10, 2011, pp. 1-3.*
(Continued)

*Primary Examiner* — William Bashore
*Assistant Examiner* — Gregory A Distefano
(74) *Attorney, Agent, or Firm* — Birch, Stewart, Kolasch & Birch, LLP

(57) ABSTRACT

A display device that displays electronic books includes a display unit configured to display information indicating that an unread electronic book is present, in a case that an application for displaying contents of an electronic book is not full-displayed on a screen.

18 Claims, 17 Drawing Sheets

(51) Int. Cl.
*G06Q 10/10* (2012.01)
*G06F 15/02* (2006.01)

(58) Field of Classification Search
USPC .......................................... 715/810; 11/810
See application file for complete search history.

(56) References Cited

U.S. PATENT DOCUMENTS

| | | | |
|---|---|---|---|
| 6,725,228 B1* | 4/2004 | Clark | G06Q 10/107 |
| 2002/0035697 A1* | 3/2002 | McCurdy | G06F 17/30011 |
| | | | 726/3 |
| 2004/0140975 A1* | 7/2004 | Saito et al. | 345/418 |
| 2004/0172455 A1* | 9/2004 | Green et al. | 709/207 |
| 2005/0044058 A1* | 2/2005 | Matthews | G06F 9/4418 |
| 2006/0135136 A1* | 6/2006 | Kim | H04M 1/72544 |
| | | | 455/414.1 |
| 2009/0021780 A1* | 1/2009 | Sato | H04N 1/00347 |
| | | | 358/1.15 |
| 2009/0024926 A1* | 1/2009 | Morotomi | 715/716 |
| 2009/0164887 A1* | 6/2009 | Ikegami | G06F 17/30905 |
| | | | 715/247 |
| 2012/0036431 A1* | 2/2012 | Ito et al. | 715/273 |
| 2012/0303418 A1* | 11/2012 | Poreh | 705/7.35 |
| 2013/0185198 A1* | 7/2013 | Lorch | G06Q 20/29 |
| | | | 705/39 |

FOREIGN PATENT DOCUMENTS

| | | |
|---|---|---|
| JP | 2003-298715 A | 10/2003 |
| JP | 2007-129506 A | 5/2007 |
| JP | 2009-135715 A | 6/2009 |

OTHER PUBLICATIONS

"Calibre tips and tricks", taken from http://blog.calibre-ebook.com/2011/11/calibre-custom-columns.html, published Nov. 25, 2011, pp. 1-8.*

* cited by examiner

FIG. 7

| BOOK ID | DOWNLOADED DATE | PURCHASED DATE | PUBLISHED DATE | READING START DATE | LAST READ DATE | NUMBER OF TIMES READ | TOTAL AMOUNT OF READING TIME | VALIDITY PERIOD START DATE | VALIDITY PERIOD END DATE | SUBSCRIBE FLAG | ... |
|---|---|---|---|---|---|---|---|---|---|---|---|
| 12345 | 2011/4/20 | 2011/4/20 | 2011/4/20 | UNREAD | — | 0 | 0 MINUTE | — | — | 0 | ... |
| 23456 | 2011/4/16 | 2011/4/16 | 2011/1/10 | 2011/4/17 | 2011/4/19 | 4 | 720 MINUTES | — | — | 0 | ... |
| 34567 | 2011/4/13 | 2011/4/13 | 2011/4/13 | UNREAD | — | 0 | 0 MINUTE | 2011/4/13 | 2011/4/20 | 1 | ... |
| 45678 | 2011/4/11 | 2011/4/11 | 2011/4/11 | UNREAD | — | 0 | 0 MINUTE | 2011/4/11 | 2011/4/18 | 1 | ... |
| 56789 | 2011/4/10 | 2011/4/10 | 2010/10/3 | 2011/4/12 | 2011/4/16 | 35 | 4362 MINUTES | — | — | 0 | ... |
| ... | ... | ... | ... | ... | ... | ... | ... | ... | ... | ... | ... |

FIG. 8

| BOOK ID | DOWNLOADED DATE | PUBLISHED DATE | READING START DATE | LAST READ DATE | NUMBER OF TIMES READ | TOTAL AMOUNT OF READING TIME | VALIDITY PERIOD START DATE | VALIDITY PERIOD END DATE | ... |
|---|---|---|---|---|---|---|---|---|---|
| 98765 | 2011/4/18 | 2011/4/18 | UNREAD | — | 0 | 0 MINUTE | 2011/4/18 | 2011/4/25 | ... |
| 87654 | 2011/4/18 | 2011/4/18 | 2011/4/19 | 2011/4/19 | 1 | 32 MINUTES | 2011/4/18 | 2011/4/25 | ... |
| 76543 | 2011/4/16 | 2011/4/13 | UNREAD | — | 0 | 0 MINUTE | 2011/4/13 | 2011/4/20 | ... |
| 65432 | 2011/4/13 | 2011/4/13 | UNREAD | — | 0 | 0 MINUTE | 2011/4/13 | 2011/4/20 | ... |
| 54321 | 2011/4/11 | 2011/4/11 | 2011/4/13 | 2011/4/15 | 4 | 162 MINUTES | 2011/4/11 | 2011/4/18 | ... |
| ... | ... | ... | ... | ... | ... | ... | ... | ... | ... |

FIG. 9

| ID | DOWNLOADED DATE | PUBLISHED DATE | REFERRED DATE | NOTICE TITLE | NOTICE CONTENTS | ... |
|---|---|---|---|---|---|---|
| abcde | 2011/4/18 | 2011/4/18 | UNREAD | RELEASE OF FUNCTION A | FUNCTION A WAS ADDED.... | ... |
| bcdef | 2011/4/16 | 2011/4/13 | 2011/4/16 | REQUEST FOR VERSION UPGRADE | ... VERSION X OF BOOK APPLICATION | ... |
| cdefg | 2011/4/10 | 2011/4/8 | UNREAD | ... | ... | ... |
| defgh | 2011/3/28 | 2011/3/28 | 2011/3/30 | ... | ... | ... |
| efghij | 2011/3/16 | 2011/3/14 | 2011/4/13 | ... | ... | ... |
| ... | ... | ... | ... | ... | ... | ... |

DISPLAY DEVICE, DISPLAY METHOD, AND NON-TRANSITORY COMPUTER-READABLE RECORDING MEDIUM

TECHNICAL FIELD

The present invention relates to a display device, a display method, a display program, and a processor.

Priority is claimed on Japanese Patent Application No. 2011-098438, filed Apr. 26, 2011, the content of which is incorporated herein by reference.

BACKGROUND ART

Various functions (also referred to as "appli" or "application") have been provided for electronic terminal devices, such as cellular phones and electronic book devices. For example, Patent Document 1 discloses a cellular terminal device that retrieves candidates to be converted from a dictionary unit in accordance with an input, receives a selection of a candidate from the retrieved candidates to be converted, and performs a process in accordance with the selected candidate received.

CITATION LIST

Patent Document

[Patent Document 1] Japanese Patent Unexamined Application, First Publication No. 2009-135715

DISCLOSURE OF INVENTION

Problems to be Solved by the Invention

By the way, recently, electronic books have gained popularity. Applications dedicated for electronic book services have been released for electronic terminal devices.

However, electronic terminals have to boot dedicated applications in order to confirm information concerning electronic books. In other words, users have not been able to easily confirm information concerning electronic books and conveniently use electronic book services.

The present invention has been made in view of the above circumstances, and provides a display device, a display method, a display program, and a processor, which can conveniently use electronic book services.

Means for Solving the Problems (1) The present invention has been made to solve the above problem, a display device according to one aspect of the present invention is a display device configured to display electronic books. The display device includes a display unit configured to display information indicating that an unread electronic book is present, in a case that an application for displaying contents of an electronic book is not full-displayed on a screen.

(2) In the above display device, the display unit may be configured to simultaneously display information indicating that unread electronic books belonging to at least two groups are present.

(3) In the above display device, the display unit may be configured to display, as the information indicating that an unread electronic book is present, a number of unread items indicating a number of unread electronic books, or an image indicating that an unread electronic book is present.

(4) In the above display device, the display unit may be configured to display, as the information indicating that an unread electronic book is present, an image indicating that an unread electronic book is present.

(5) In the above display device, the display unit may be configured to display, in a case that the number of unread electronic books is greater than a predetermined value, information indicating that the number of unread electronic books is greater than the predetermined value.

(6) In the above display device, the display unit may be configured to display a first list of images indicating unread electronic books.

(7) In the above display device, the display unit may be configured to display a second list of images indicating electronic books. The above display device may further include a display control unit configured to determine a display order of the images included in the first list, based on a display order of images included in the second list. In this case, the display unit may be configured to display the first list of images in the display order determined by the display control unit.

(8) The above display device may further include a display control unit configured to determine a display order of the images included in the first list, based on groups to which electronic books belong. In this case, the display unit may be configured to display the first list of images in the display order determined by the display control unit.

(9) The above display device may further include a display region control unit configured to determine a display region for the images included in the first list, based on groups to which electronic books belong. In this case, the display unit may be configured to display the first list of images in the display region determined by the display region control unit.

(10) A display method according to another aspect of the present invention is a display method for a display device. The display method includes displaying information indicating that an unread electronic book is present, in a case that an application for displaying contents of an electronic book is not full-displayed on a screen.

(11) A display program according to another aspect of the present invention causes a computer of a display device to execute displaying information indicating that an unread electronic book is present, in a case that an application for displaying contents of an electronic book is not full-displayed on a screen.

Effects of the Invention

According to the present invention, it is possible to conveniently use electronic book services.

BRIEF DESCRIPTION OF THE DRAWINGS

FIG. 7 is a schematic diagram illustrating an example of a book management information table according to the first embodiment.

FIG. 8 is a schematic diagram illustrating an example of another book management information table according to the first embodiment.

FIG. 9 is a schematic diagram illustrating an example of a notice information table according to the first embodiment.

BEST MODE FOR CARRYING OUT THE INVENTION (First Embodiment)

Hereinafter, embodiments of the present invention are explained in detail with reference to drawings.

Figure 1:
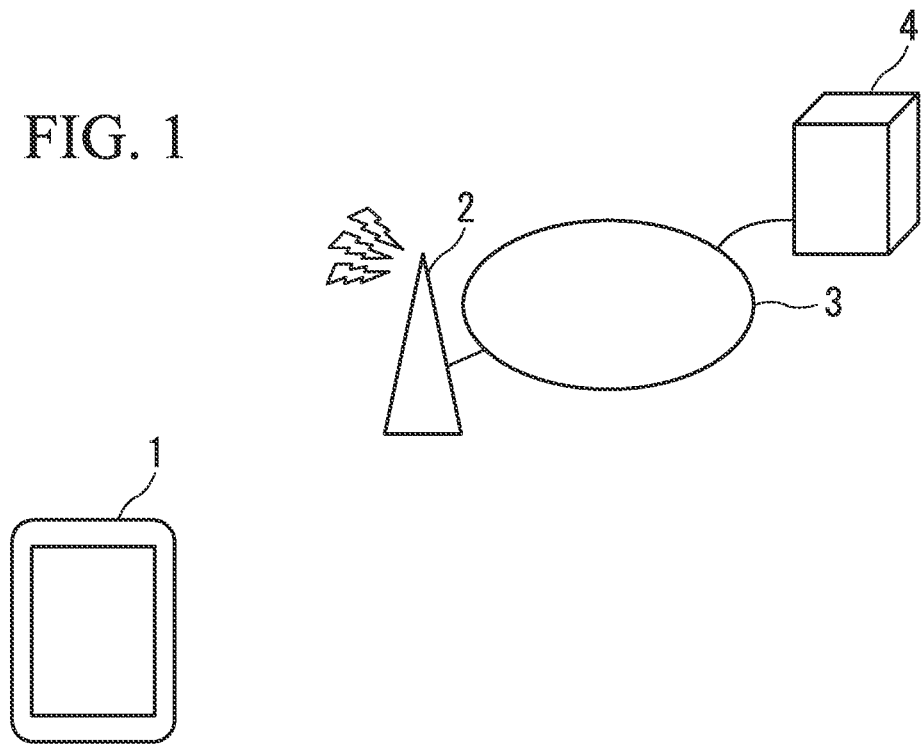
FIG. 1 is a schematic diagram illustrating an example of a communication system according to a first embodiment of the present invention.

FIG. 1 is a schematic diagram illustrating an example of a communication system according to a first embodiment of the present invention. In FIG. 1, the communication system includes: an electronic terminal device 1; a base station device 2; a network 3; and a store server 4.

The electronic terminal device 1 is a mobile terminal device, an electronic book device, or the like. The electronic terminal device 1 provides functions of downloading, storing, displaying, and the like of electronic books.

The store server 4 provides electronic books and information concerning electronic books to the electronic terminal device 1 via the network 3 and the base station device 2. Here, information concerning electronic books includes group information indicating a group to which an electronic book belongs ("BOOK" or "RECOMMENDED"), information indicating that this electronic book is a subscribed/unsubscribed electronic book (including a serial publication, a periodical publication, and a non-periodical publication). Additionally, the store server 4 provides information to be displayed on a browser of the electronic terminal device 1 (also referred to as a "store page"). Further, the store server 4 delivers notice information to the electronic terminal device 1.

Figure 2:
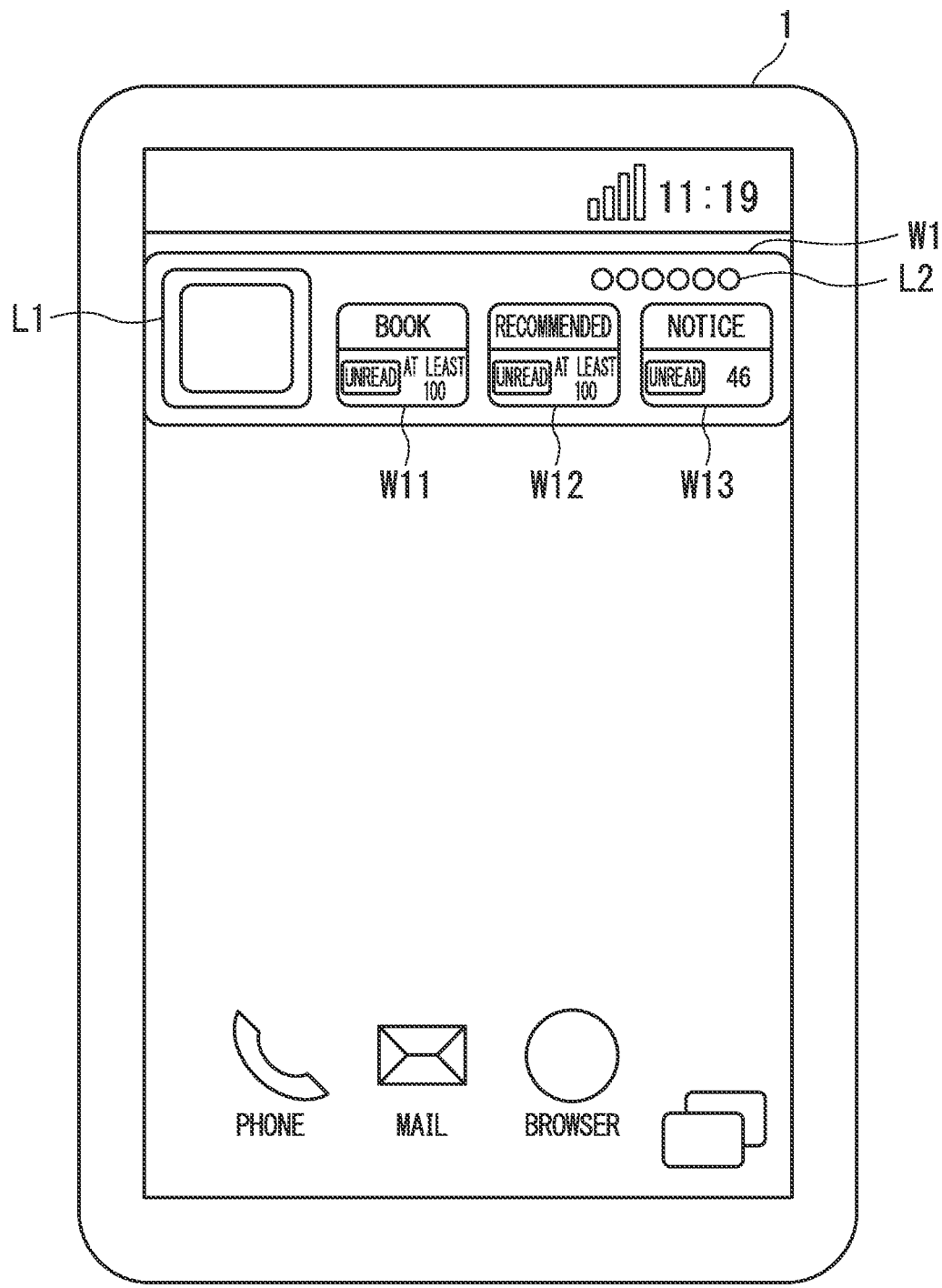
FIG. 2 is a schematic diagram illustrating an example of a display of an electronic terminal device according to the first embodiment.

FIG. 2 is a schematic diagram illustrating an example of a display (vertically long display) of the electronic terminal device 1 according to the first embodiment. In FIG. 2, an image appended with a reference symbol W1 denotes a widget W1. The widget W1 is displayed while being integrated into a page or a window. The widget W1 can be displayed in a case where an application dedicated for electronic book service (also referred to as an electronic book application) is not running, in a case where the application is not full-displayed on a screen, or in a case where the application is running without being displayed on the screen.

Here, a widget means a simple application (one type of application) that runs and is displayed on part of a window (a top window or a home window) to be displayed at the time when the electronic terminal device 1 is started to use. The widget displays information concerning the electronic terminal device 1 or an application without booting that application itself, and provides part of functions of the electronic terminal device 1 or the application. The widget uses only a part of the window. For this reason, if multiple widgets are arranged on the window, various informations can be confirmed quickly. Additionally, the widget can operate as a button for booting an application, and does not consume many resources of the electronic terminal device 1 (such as a memory, a CPU, a display, and the like). Therefore, the widget is suitable to be displayed on an idle window of the electronic terminal device 1.

Logos L1 and L2 of a store are displayed on the widget W1. Here, the widget W1 has the size of 4 (horizontal)×1 (vertical).

The number of unread electronic books is displayed for each group on the widget W1. For example, an image W11 appended with a reference symbol W11 indicates that at least 100 unread electronic books are included in the electronic books belonging to the group "BOOK". An image W12 appended with a reference symbol W12 indicates that at least 100 unread electronic books are included in the electronic books belonging to the group "RECOMMENDED". Here, in a case where the number of unread electronic books is less than 100, the number of the unread books is displayed on the images W11 and W12. An image W13 appended with a reference symbol W13 indicates that there are "46" unread notice informations. Additionally, "UNREAD" is an image indicating that there is an unread electronic book. In other words, the electronic terminal device 1 displays on an area of an operation unit (touch panel) for booting an application, the images of "UNREAD" or the numbers of unread electronic books, which are associated with at least two groups.

Thus, in the first embodiment, the images of "UNREAD" or the numbers of unread electronic books are displayed even in a case where an electronic book application is not running, thereby enabling a user to conveniently use electronic book services.

Figure 3:
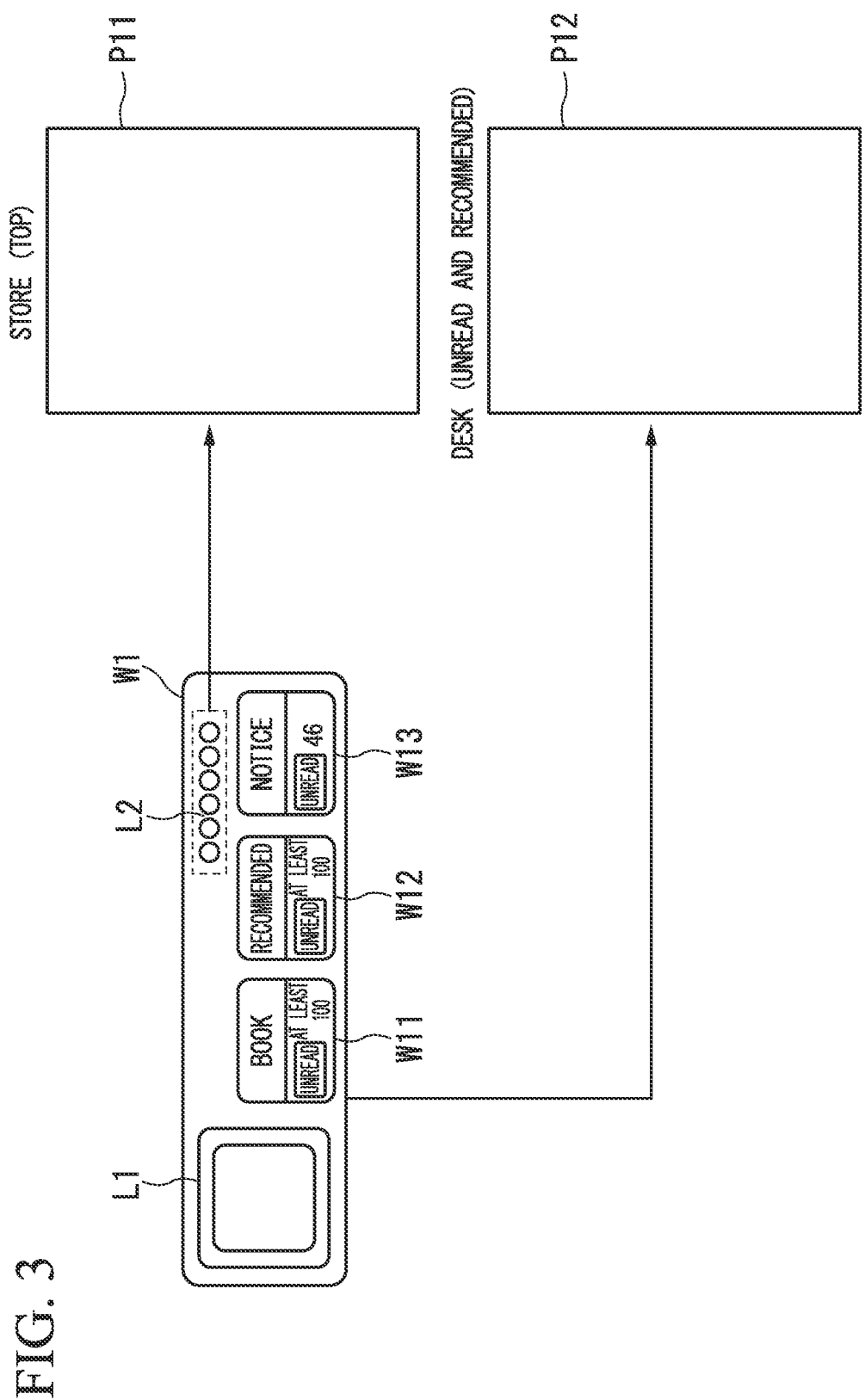
FIG. 3 is a schematic diagram illustrating an example of a link of a widget according to the first embodiment.

FIG. 3 is a schematic diagram illustrating an example of a link of the widget W1 according to the first embodiment. This drawing illustrates that if the logo L2 is selected (tapped, clicked), the electronic terminal device 1 displays a store page P11 (see FIG. 4). Additionally, this drawing illustrates that if a region other than the logo L2 is selected, the electronic terminal device 1 displays a desk page P12 (see FIG. 5).

Here, in a case where the logo L1 is selected, the electronic terminal device 1 may display the store page P11. Additionally, if the image W11, W12, or W13 is selected, a page concerning the associated group may be displayed. For example, in a case where the image W12 is selected, the electronic terminal device 1 may display a list of electronic books belonging to "RECOMMENDED" on the store page or the desk page. Additionally, in a case where the image W13 is selected, the electronic terminal device 1 may display a list of notice informations on the store page or the desk page, or as a notice dedicated list.

Figure 4:
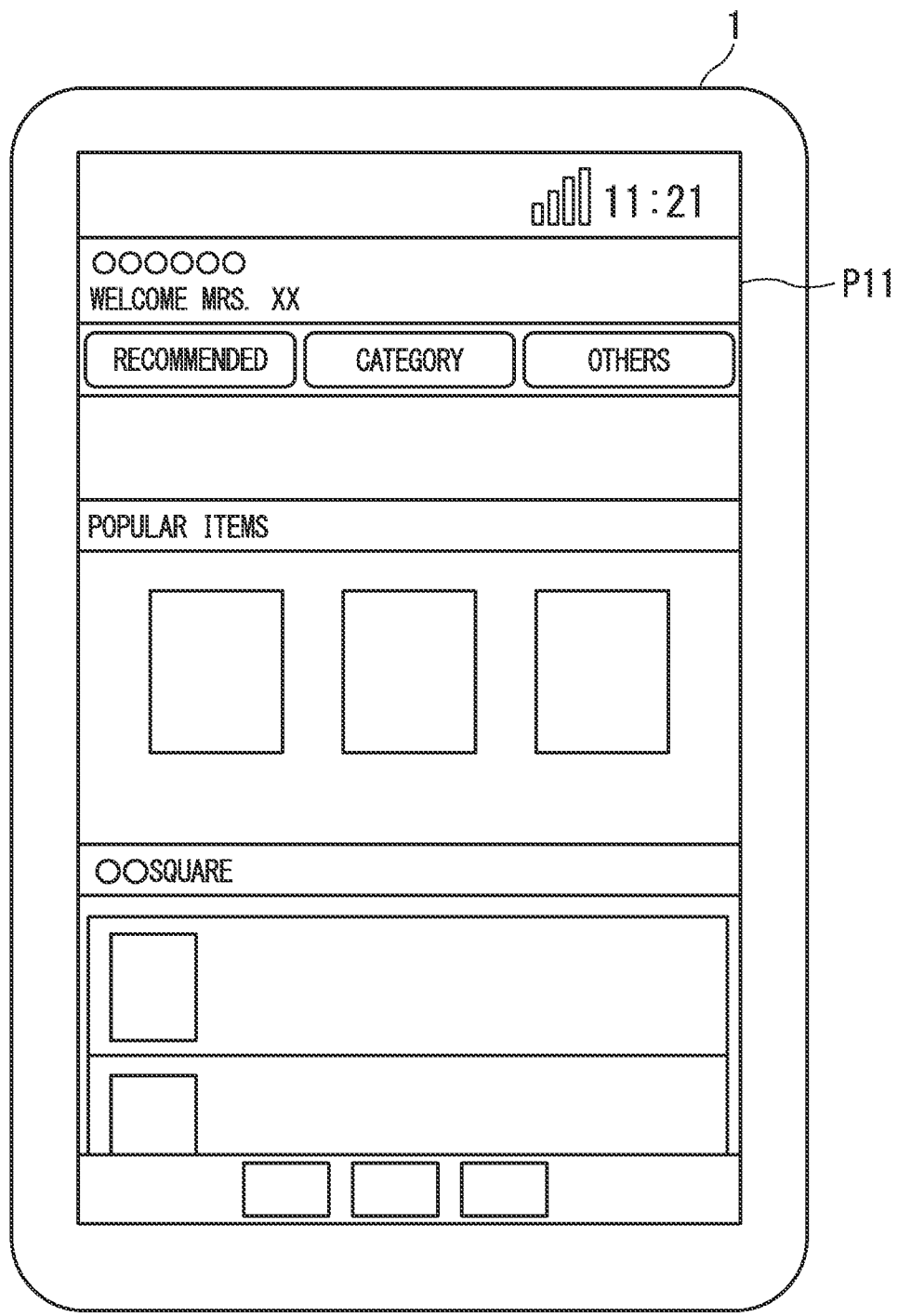
FIG. 4 is a schematic diagram illustrating an example of a store page according to the first embodiment.

FIG. 4 is a schematic diagram illustrating an example of the store page P11 according to the first embodiment. This diagram is a diagram illustrating a case where the electronic terminal device 1 boots a browser and displays on the browser, the store page P11 downloaded from the store server 4.

Figure 5:
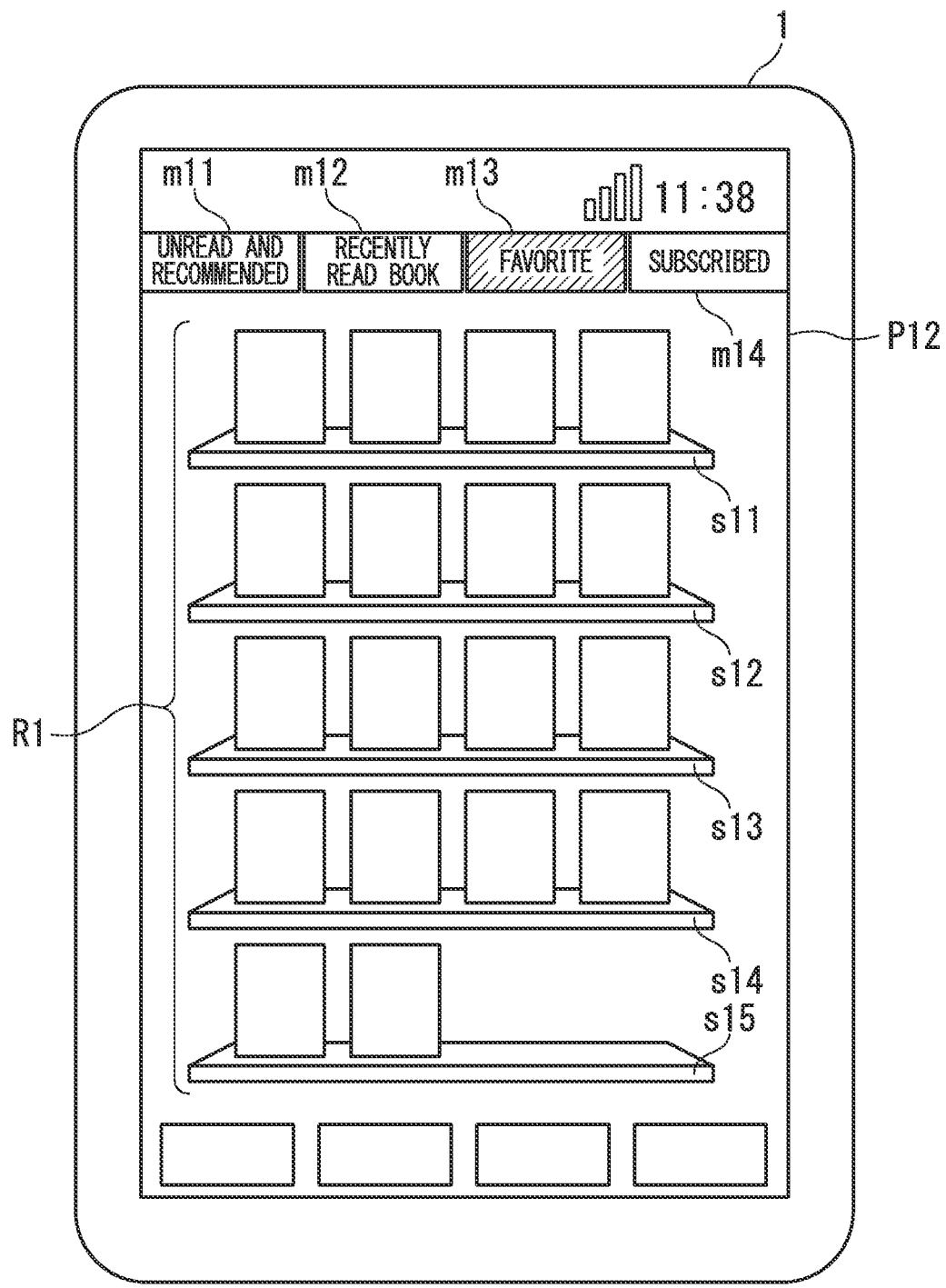
FIG. 5 is a schematic diagram illustrating an example of a desk page according to the first embodiment.

FIG. 5 is a schematic diagram illustrating an example of the desk page P12 according to the first embodiment. This diagram is a diagram illustrating a case where the electronic terminal device 1 boots an electronic book application and displays the desk page 12. Here, in the case of FIG. 5, the electronic terminal device 1 does not display the widget W1. However, the present invention is not limited thereto, and the electronic terminal device 1 may overlay-display the widget W1 on the desk page P12.

In FIG. 5, images m11 to m14 appended with reference symbols m11 to m14 denote images to be used for selecting groups of "UNREAD/RECOMMENDED", "RECENTLY READ BOOK", "FAVORITE", and "SUBSCRIBED", respectively. For example, in "UNREAD/RECOMMENDED", unread electronic books which a user has purchased, or which the user has subscribed and have been delivered, are sequentially displayed. Alternatively, electronic books delivered from the store server 4 free of charge are sequentially displayed. In "RECENTLY READ BOOKS", electronic books are sequentially displayed in order of reading start date. In "FAVORITE", electronic books are sequentially displayed in order of date that a user registers each book to "FAVORITE". In "SUBSCRIBED", electronic books delivered by the subscription contract are sequentially displayed. This drawing shows that the hatched image m13 is selected, and images (thumbnail images) indicating electronic books belonging to the group "FAVORITE" are displayed in a region R1 appended with a reference symbol R1. In the region R1, an image of a five-stage shelf including shelves s11 to s15 is displayed, and thumbnail images of electronic books are displayed on the image of each shelf as if the electronic books are arranged on each shelf. Here, the maximum four thumbnail images of electronic books are displayed on one shelf in a predetermined order. Here, regarding to another group, images of the shelves s11 to s15 and thumbnail images are displayed similarly.

Figure 6:
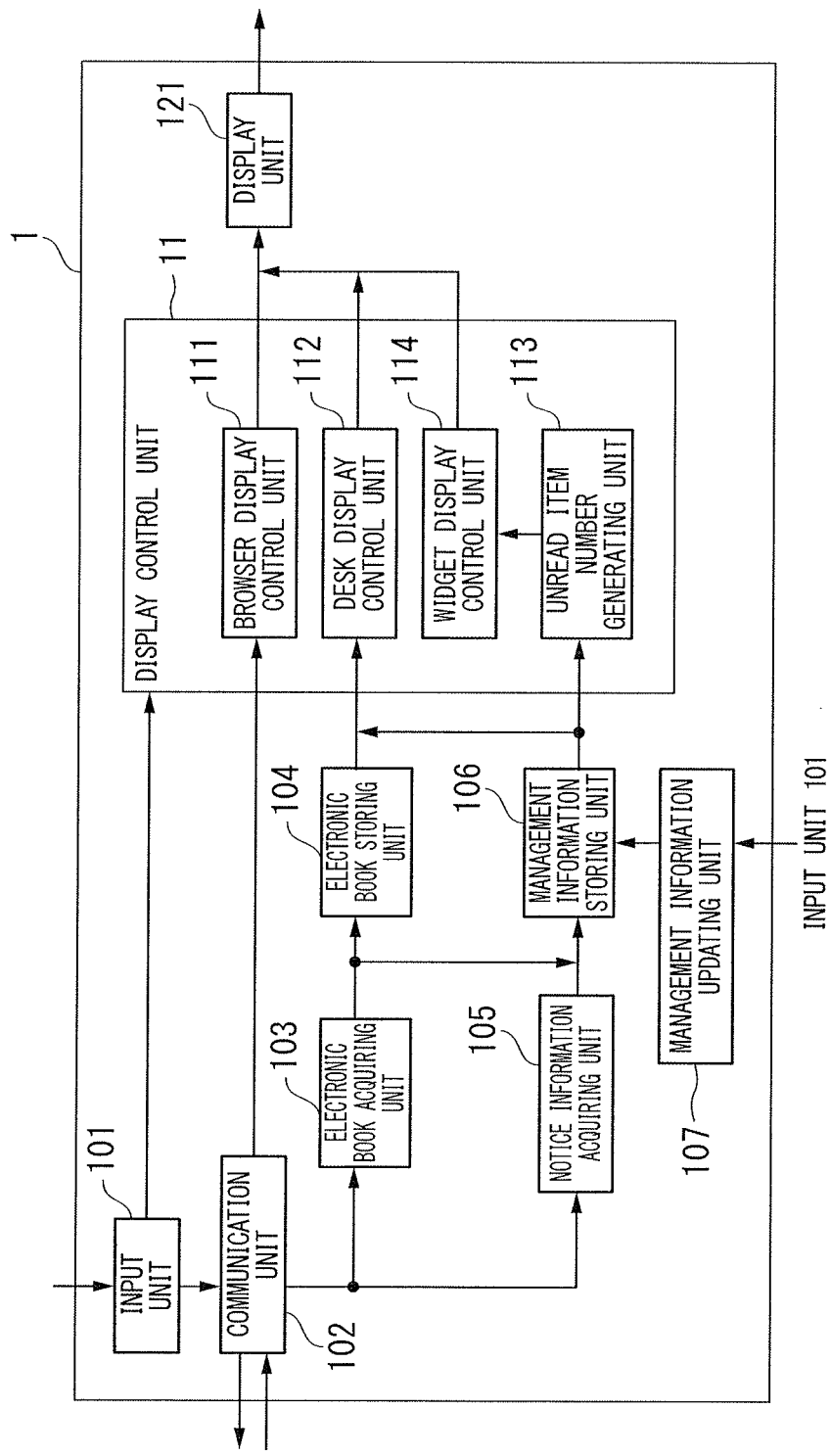
FIG. 6 is a schematic block diagram illustrating a configuration of the electronic terminal device according to the first embodiment.

FIG. 6 is a schematic block diagram illustrating a configuration of the electronic terminal device 1 according to the first embodiment. In FIG. 6, the electronic terminal device 1 includes: an input unit 101; a communication unit 102; an electronic book acquiring unit 103; an electronic book storing unit 104; a notice information acquiring unit 105; a management information storing unit 106; a management information updating unit 107; a display control unit 11; and a display unit 121. Each storing unit may be a storage device mounted on the main body or an external storage device. The display control unit 11 includes: a browser display control unit 111; a desk display control unit 112; an unread item number generating unit 113; and a widget display control unit 114. Here, the electronic terminal device 1 has known functions (not shown) of electronic terminal devices other than the above configurations.

The input unit 101 receives an input from a user. The input unit 101 outputs information associated with the received input, to the communication unit 102, the management information updating unit 107, and the display control unit 11. Here, the input unit 101 is implemented by a touch panel or operation buttons.

The communication unit 102 communicates with the base station device 2 based on the information received from the input unit 101 or an instruction of a computer program. The communication unit 102 receives information from the store server 4, and outputs the received information to each unit of the electronic terminal device 1. For example, the communication unit 102 receives a store page from the store server 4, and outputs the received store page to the browser display control unit 111.

The electronic book acquiring unit 103 receives from the store server 4 via the communication unit 102, an electronic book and information concerning the electronic book. The electronic book acquiring unit 103 stores the received electronic book (such as a book ID and information concerning the contents of the electronic book) in the electronic book storing unit 104. The electronic book acquiring unit 103 stores the received information concerning the electronic book, as book management information, in a book management information table of the management information storing unit (see FIGS. 7 and 8). Here, the electronic book acquiring unit 103 allocates the book management information to each group ("BOOK" and "RECOMMENDED") indicated by group information included in the information concerning the electronic book, and stores the allocated book management informations in the book management information table.

The notice information acquiring unit 105 receives notice information delivered from the store server 4 via the communication unit 102. The notice information acquiring unit 105 stores the received notice information in a notice information table of the management information storing unit 106 (see FIG. 9).

The management information updating unit 107 updates the information stored by the management information updating unit 107, based on the information received from the input unit 101. For example, when a user opens an electronic book, the management information updating unit 107 writes the date that reading is started in the reading start date associated with the book ID of the opened electronic book.

The browser display control unit 111 generates display information for a store page, based on the store page received from the communication unit 102. The browser display control unit 111 outputs the generated display information to the display unit 121.

In accordance with the information received from the input unit 101, the desk display control unit 112 reads the information stored by the management information storing unit 104 and the electronic books stored by the electronic book storing unit 104. The desk display control unit 112 generates display information for the desk page based on the read informations, and outputs the generated display information to the display unit 121.

Based on the information stored by the management information storing unit 104, the unread item number generating unit 113 calculates the number of unread books for each group and the number of unread notice informations. The unread item number generating unit 113 outputs to the widget display control unit 114, information indicating the calculated numbers of unread items.

The widget display control unit 114 generates display information for the widget W1. Here, the widget W1 includes display information concerning the numbers of unread items indicated by the informations received from the unread item number generating unit 113. The widget display control unit 114 outputs the generated display information to the display unit 121.

The display unit 121 displays the display informations received from the browser display control unit 111, the desk display control unit 112, and the widget display control unit 114.

FIG. 7 is a schematic diagram illustrating an example of the book management information table according to the first embodiment. The book management information table shows a book management information table concerning electronic books belonging to the group "BOOK". Here, the books belonging to the group "BOOK" are electronic books that a user has subscribed, which include electronic books purchased by the user (including a serial publication, a periodical publication, and a non-periodical publication), and electronic books downloaded free of charge.

In FIG. 7, the book management information table has items of the book ID, the downloaded date, the purchased date, the published date, the reading start date, the last read date, the number of times read, the total amount of reading time, the validity period start date, the validity period end date, and a subscriber flag. The book management information table stores book management information for each book ID. Here, a description of time is omitted in each value of the item concerning the date among the items of the book management information table shown in FIG. 7.

In FIG. 7, the book ID is identification information of an electronic book.

The downloaded date is the date that the electronic terminal device 1 has downloaded the electronic book identified by the book ID. The purchased date is the date that a user has subscribed the electronic book identified by the book ID. Here, the purchased date of an electronic book, such as a serial publication, a periodic publication, or a non-periodical publication, is the published date of each publication. The published date is the date that the electronic book identified by the book ID has been published. The published date is information having been set by a publisher of the book, and is included in the information concerning the electronic book.

The reading start date is the date that the user has first opened the electronic book identified by the book ID. Here, regarding the book management information associated with an electronic book having not yet been opened, "UNREAD" is written in the referred date.

The last read date is the date that the user has lastly opened the electronic book identified by the book ID. The number of times read is the number of times the user has opened the electronic book identified by the book ID. Here, the number of times read may be one in a case where the number of times read within a predetermined period is at least one. For example, in a case where counting is made in such a manner as one time per day, the number of times read is the number of days for which the user has opened the electronic book identified by the book ID.

The total amount of reading time is the total amount of time for which the user has opened the electronic book identified by the book ID.

The validity period start date and the validity period end date are respectively the start date and the end date between which the electronic book identified by the book ID can be referred to. In other words, the electronic terminal device 1 provides to the user, the electronic book identified by the book ID only in the period from the validity period start date to the validity period end date. The subscribe flag is information indicating whether or not the electronic book identified by the book ID is a periodical publication. Here, electronic books of serial publications and non-periodical publications may be set with information indicating that those electronic books are periodical publications.

For example, the book management information in the first row shown in FIG. 7 indicates that the electronic book identified by the book ID "121345" was published on "2011, Apr. 20", and purchased and downloaded by a user on the same day. This book management information indicates that the electronic book identified by the book ID "121345" is "UNREAD", that is, the electronic book has not yet been opened, and the reading start date has not yet been written therein.

Additionally, for example, the book management information in the second row shown in FIG. 7 indicates that the electronic book identified by the book ID "23456" was first opened on "2011, Apr. 17", and has been opened "4" times in total, for the total amount of time "720 minutes" by "2011, Apr. 19".

FIG. 8 is a schematic diagram illustrating another example of the book management information table according to the first embodiment. The book management information table shows the book management information table concerning electronic books belonging to the group "RECOMMENDED". Here, the books belonging to the group "RECOMMENDED" are electronic books to be recommended to a user, which include, for example, electronic books set by a store manager or an electronic book provider, and electronic books set by a computer program.

In FIG. 8, the book management information table has items of the book ID, the downloaded date, the reading start date, the last read date, the number of times read, the total amount of reading time, the validity period start date, and the validity period end date. The book management information table stores book management information for each book ID. Here, a description of time is omitted in each value of the item concerning the date among the items of the book management information table shown in FIG. 8. Additionally, the contents of each item shown in FIG. 8 are the same as those shown in FIG. 7, and therefore an explanation thereof is omitted here.

For example, the book management information in the first row shown in FIG. 8 indicates that the electronic book identified by the book ID "98765" was published on "2011, Apr. 18", and purchased and downloaded by a user on the same day. This book management information indicates that the electronic book identified by the book ID "98765" is "UNREAD", that is, the electronic book has not yet been opened, and the reading start date has not yet been written therein.

FIG. 9 is a schematic diagram illustrating an example of a notice information table according to the first embodiment. In FIG. 9, the notice information table has items of an ID of notice information, the downloaded date, the purchased date, the published date, the referred date, the notice title, and the notice contents. Here, a description of time is omitted in the value of the item concerning the date among the items of the notice information table shown in FIG. 9.

In FIG. 9, the ID is identification information of notice information.

The downloaded date is the date that the electronic terminal device 1 downloaded the notice information identified by the ID. The published date is the date that the notice information identified by the ID was published. The referred date is the date that the electronic terminal device first displayed the contents of the notice associated with the ID.

Here, regarding the notice information, the contents of which have not yet been displayed, "UNREAD" is written in the referred date.

The notice title is the title of the notice contents. The notice title is used in a case where a list of notices is displayed. The notice contents are the contents of a notice.

For example, the notice information in the first row shown in FIG. 9 indicates that the notice identified by the ID "abcde" was published on "2011, Apr. 18", and purchased and downloaded by a user on the same day. This notice information indicates that the title is "FUNCTION A RELEASED" and the contents are that "FUNCTION A HAS BEEN ADDED . . . ". This notice information indicates that the notice identified by the ID "abcde" is "UNREAD", that is, the notice information has not yet been opened, and the referred date has not yet been written therein.

Figure 10:
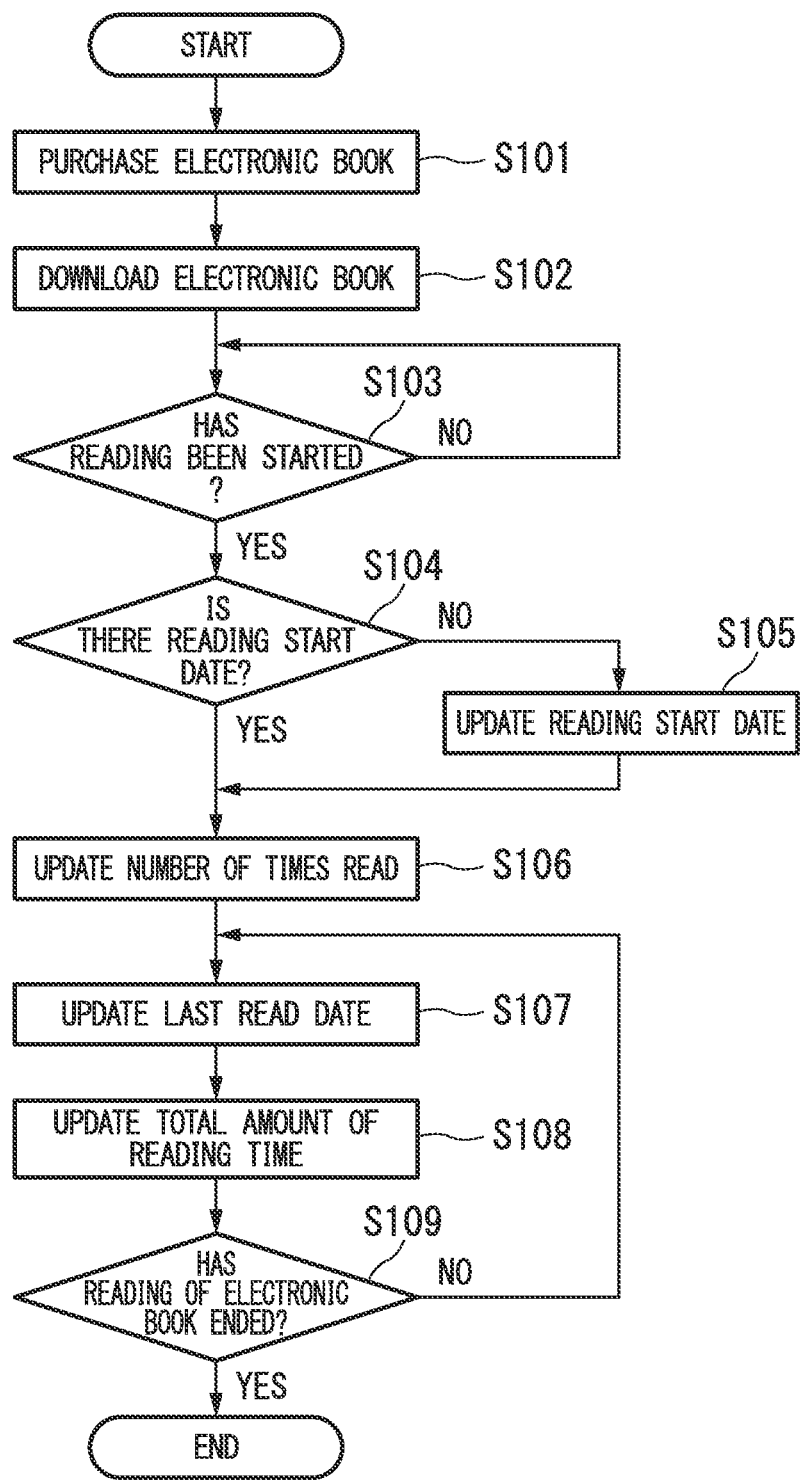
FIG. 10 is a flowchart illustrating an example of operation of the electronic terminal device according to the first embodiment.

FIG. 10 is a flowchart illustrating an example of operation of the electronic terminal device 1 according to the first embodiment.

(Step S101) Based on a user operation, the electronic terminal device 1 transmits to the store server 4, information indicating a request to purchase an electronic book. The store server 4 stores the user ID, the book ID, and the purchased date while associating those items with one another. Then, the operation proceeds to step S102. Here, in a case where the user has subscribed the electronic book, an electronic book to be transmitted to the electronic terminal device 1 is automatically determined by operation of the store server 4, without the user operation for purchasing that electronic book.

(Step S102) Based on the input from the user, the electronic terminal device 1 transmits to the store server 4, information indicating a request to download the electronic book. This information includes the user ID and the book ID. In a case where the user ID and the book ID which are included in the information transmitted by the electronic terminal device 1 are equal to the user ID and the book ID which are included in the information stored in step S101, the store server 4 transmits to the electronic terminal device 1, the electronic book identified by the book ID and information concerning the electronic book. Here, the information concerning the electronic book includes: group information; the purchased date stored in step S101; the validity period start date; the validity period end date; and a subscribe flag. Here, the book ID may be not included in the information to be transmitted from the electronic terminal device 1. In this case, the store server 4 manages an electronic book to be transmitted for each user ID, so that upon receiving a request from the electronic terminal device 1, the store server 4 transmits the electronic book associated with the user ID and the information concerning that electronic book.

The electronic book acquiring unit 103 of the electronic terminal device 1 stores in the electronic book storing unit 104, the electronic book downloaded from the store server 4. The electronic book acquiring unit 103 stores the information concerning the electronic book downloaded from the store server 4, in a book management information table indicated by the group information included in the information concerning the electronic book. Here, the electronic terminal device 1 may not store a book management information table for each group. In this case, multiple informations concerning electronic books belonging to different groups are mixed and stored, and each information includes an item identifying the belonging group. Here, the electronic book acquiring unit 103 writes the current time in the downloaded date, and writes "UNREAD" in the reading start date. The electronic book acquiring unit 103 writes "0" time in the number of times read, and writes "0" minute in the total amount of reading time.

(Step S103) The desk display control unit 112 displays a desk page based on the input from the user and the electronic book application. Based on the input from the user, the management information update unit 107 determines whether or not the electronic book has been opened, thereby determining whether or not the user has started reading. If it is determined that reading has been started (YES), the operation proceeds to step S104. On the other hand, if it is determined that reading has not been started (NO), the operation returns to step S103.

(Step S104) The management information updating unit 107 reads the book management information associated with the electronic book for which it is determined in step S103 that reading has been started. Then, the management information updating unit 107 determines whether or not there is the reading start date in the read book management information. If there is the reading start date (YES), the operation proceeds to step S106. On the other hand, if no reading start date has been written (the reading start date is "UNREAD") (NO), the operation proceeds to step S105.

(Step S105) The management information updating unit 107 writes the current time in the reading start date included in the book management information read in step S104. Then, the operation proceeds to step S106.

(Step S106) The management information updating unit 107 adds "1" time to the number of times read included in the book management information read in step S104. Then, the operation proceeds to step S107.

(Step S107) The management information updating unit 107 writes, every time a predetermined time (such as one minute) elapses, the current time in the last read date included in the book management information read in step S104. Then, the operation proceeds to step S108.

(Step S108) The management information updating unit 107 writes, every time a predetermined time (such as one minute) elapses, that predetermined time in the total amount of reading time included in the book management information read in step S104. Then, the operation proceeds to step S109. Here, in a case where no electronic book is displayed (such as when an idle window is displayed or when another application is displayed), the management information updating unit 107 may not add the predetermined time to the total amount of reading time.

(Step S109) Based on the input from the user, the management information updating unit 107 determines whether or not the reading of the electronic book has ended. Specifically, if the electronic book is closed, or if the electronic book application is terminated, the management information updating unit 107 determines that the reading of the electronic book has ended. If the reading of the electronic book has ended (YES), the electronic terminal device terminates the operation.

On the other hand, if the reading of the electronic book has not yet ended (NOT), the operation returns to step S107.

Figure 11:
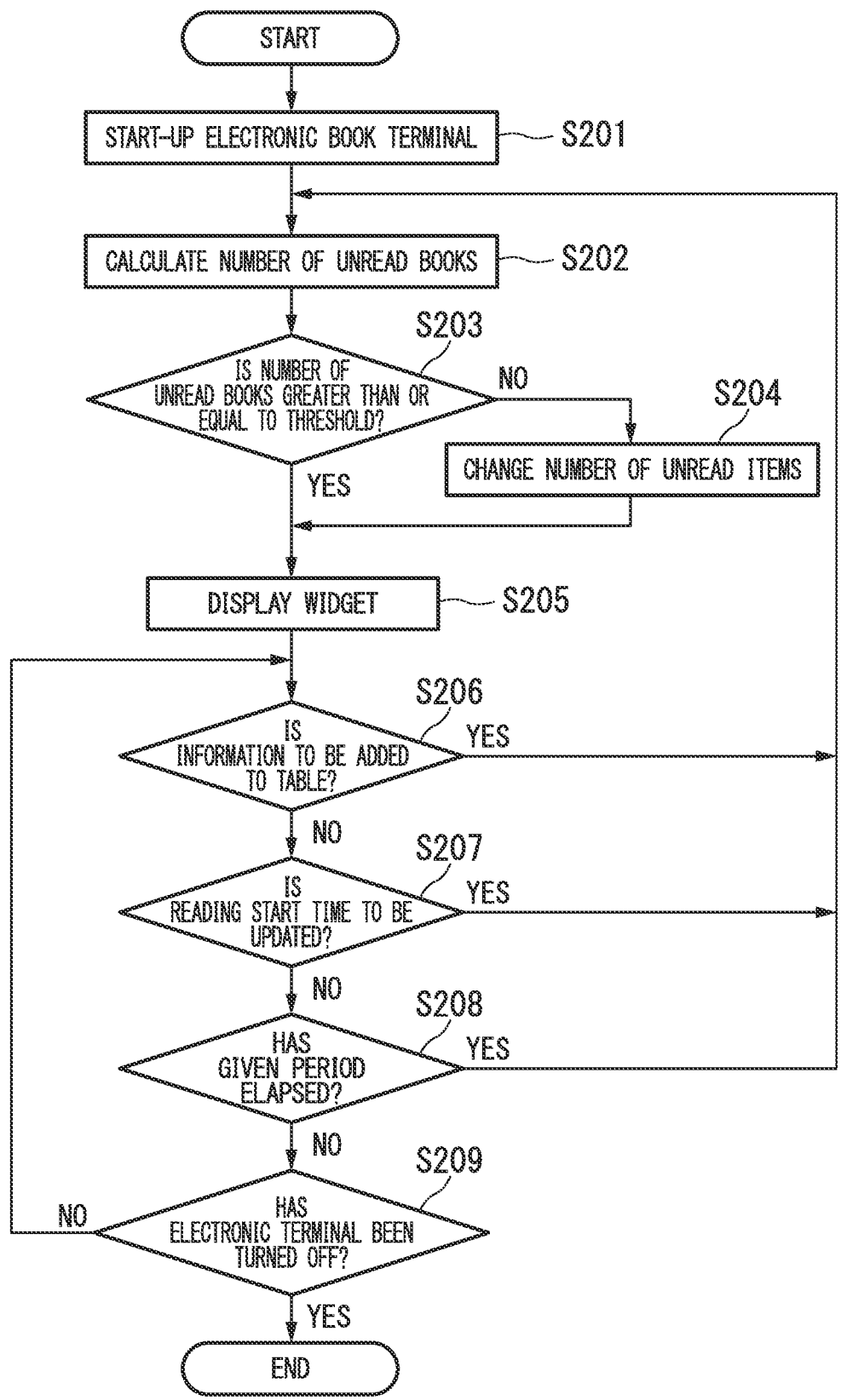
FIG. 11 is a flowchart illustrating an example of another operation of the electronic terminal device according to the first embodiment.

FIG. 11 is a flowchart illustrating an example of operation of the electronic terminal device 1 according to the first embodiment. This drawing illustrates operation in a case where a widget is displayed.

(Step S201) The electronic terminal device 1 is started-up. Then, the operation proceeds to step S201.

(Step S202) From the book management information table associated with the group "BOOK", the unread item number generating unit 113 counts the number of book management informations (the number of unread items), for which the current time is in the period from the validity period start time and the validity period end time, and in which the reading start date has not yet been written. The unread item number generating unit 113 sets the counted number of unread items to be the number of unread electronic books belonging to the group "BOOK". From the book management information table associated with the group "RECOMMENDED", the unread item number generating unit 113 counts the number of book management informations (the number of unread items) in which the reading start date has not yet been written. The unread item number generating unit 113 sets the counted number of unread items to be the number of unread electronic books belonging to the group "RECOMMENDED". From the notice information table associated with the group "NOTICE", the unread item number generating unit 113 counts the number of book management informations (the number of unread items) in which the reading start date has not yet been written. The unread item number generating unit 113 sets the counted number of unread items to be the number of unread items belonging to the group "NOTICE". Here, the management information updating unit 107 may determine whether or not the current time is within the validity period, and independently perform another process of deleting electronic books whose validity periods have expired.

(Step S203) The unread item number generating unit 113 determines whether or not each of the counted numbers of unread items is greater than or equal to a threshold value T (such as T=100). If it is determined that at least one of the numbers of unread items exceeds the threshold value, the operation proceeds to step S205. On the other hand, if it is determined that all the numbers of unread items are smaller than the threshold value, the operation proceeds to step S204.

(Step S204) The unread item number generating unit 113 changes the number of unread items, which is greater than or equal to the threshold value, to "AT LEAST T" (such as "AT LEAST 100"). Then, the operation proceeds to step S205.

(Step S205) The widget display control unit 114 displays the widget W1. Here, the widget display control unit 114 displays, for each group, the numbers of unread items counted in step S202 (the changed number of unread items in a case where a change has been made in step S204). Here, regarding the group for which the number of unread items is "0" item, the widget display control unit 114 does not display the number of unread items nor the image of "UNREAD". For this reason, the user can easily recognize that there is at least one unread item, only by viewing the widget. Then, the operation proceeds to step S206.

(Step S206) The unread item number generating unit 113 determines whether or not information (record) has been added to a table stored in the management information storing unit 106. If it is determined that information has been added to a table (YES), the operation returns to step S202. In other words, the electronic terminal device 1 updates the number of unread items, for example, in a case where downloading of a book is completed, or in a case where downloading of a periodical publication and the like or recommended information is completed. Thus, the electronic terminal device 1 can display the latest number of unread items.

On the other hand, if it is determined that no information has been added to any table (NO), the operation proceeds to step S207.

(Step S207) The unread item number generating unit 113 determines whether or not the reading start date or the referred date in a table stored in the management information storing unit 106 has been updated. If it is determined that the reading start date or the referred date has been updated (YES), the operation returns to step S202. In other words, the electronic terminal device 1 updates the number of unread items, for example, in a case where an electronic book is opened. Specifically, when an OS window is displayed after the contents of an unread electronic book are displayed on a viewer (the electronic book is opened), the number of unread items is decreased by one item. Thus, the electronic terminal device 1 can display the latest number of unread items.

On the other hand, If it is determined that the reading start date or the referred date has not been updated (NO), the operation returns to step S208.

(Step S208) The unread item number generating unit 113 determines whether or not a given period has elapsed from the previous step S208. If it is determined that the given period has elapsed (YES), the operation returns to step S202. In other words, the electronic terminal device 1 updates the number of unread items every time the given period elapses. Thus, the electronic terminal device 1 can exclude from the number of unread items, the unread electronic book whose validity period end date has expired. Therefore, the electronic terminal device 1 can display the latest number of unread items.

On the other hand, if it is determined that the given period has not elapsed (NO), the operation returns to step S209.

(Step 209) If a switch of the electronic terminal device 1 is turned off (YES), the operation ends. On the other hand, if the switch of the electronic terminal device 1 is not turned off (NO), the operation proceeds to step S206.

Thus, according to the first embodiment, the display unit 121 displays the information indicating that there is an unread electronic book in a case where an application (electronic book application) that displays the contents of an electronic book is not running or not full-displayed on the screen. Thus, the electronic terminal device 1 enables the user to conveniently use the electronic book services.

Additionally, according to the first embodiment, the display unit 121 displays the number of unread items. Thus, the electronic terminal device 1 can inform the user of the number of unread items, thereby urging the user to read an electronic book.

Further, according to the first embodiment, in a case where the number of unread items is greater than a predetermined value, the display unit 121 displays information indicating that the number of unread items is greater than or equal to that value. Thus, the electronic terminal device 1 can inform the user of the number of unread items without increasing the display area. Moreover, in a case where the number of unread items is significantly great, it is possible to prevent the user from ignoring the number of unread items, and from feeling stressful due to the great number of unread items.

Additionally, according to the first embodiment, the display unit 121 displays, for each predetermined group, the number of unread electronic books belonging to the group. Thus, the electronic terminal device 1 can inform the user of the number of unread items for each group.

Figure 12:
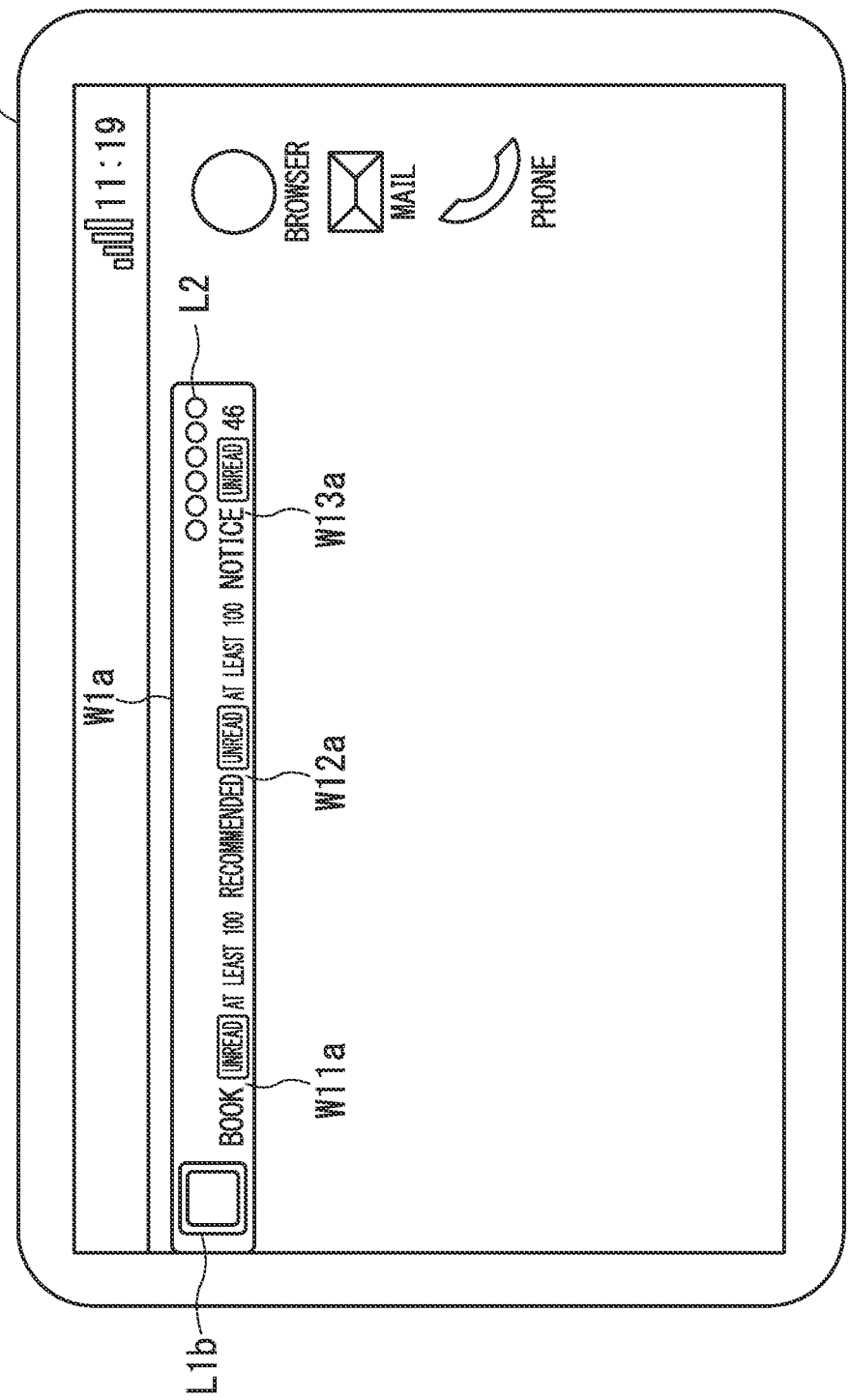
FIG. 12 is a schematic diagram illustrating another example of a display of the electronic terminal device according to the first embodiment.

FIG. 12 is a schematic diagram illustrating another example of a display (horizontally long display) of the electronic terminal device 1 according to the first embodiment. This drawing illustrates an example of a display in a case where the electronic terminal device 1 shown in FIG. 2 is rotated at 90 degrees.

In FIG. 12, the widget W1a is shorter in the vertical direction and longer in the horizontal direction, compared to the widget 1. For example, in the images W11a to W13a, the name of group and the number of unread items are displayed in the same row (displayed in different rows in the case of FIG. 2). In other words, the electronic terminal device 1 displays the name of group and the number of unread items in the same row, thereby displaying the widget W1a that is short in length in the vertical direction. Thus, the user can use the region other than the widget W1a without limiting the length of the screen in the vertical direction.

MODIFIED EXAMPLE 1

Figure 13:
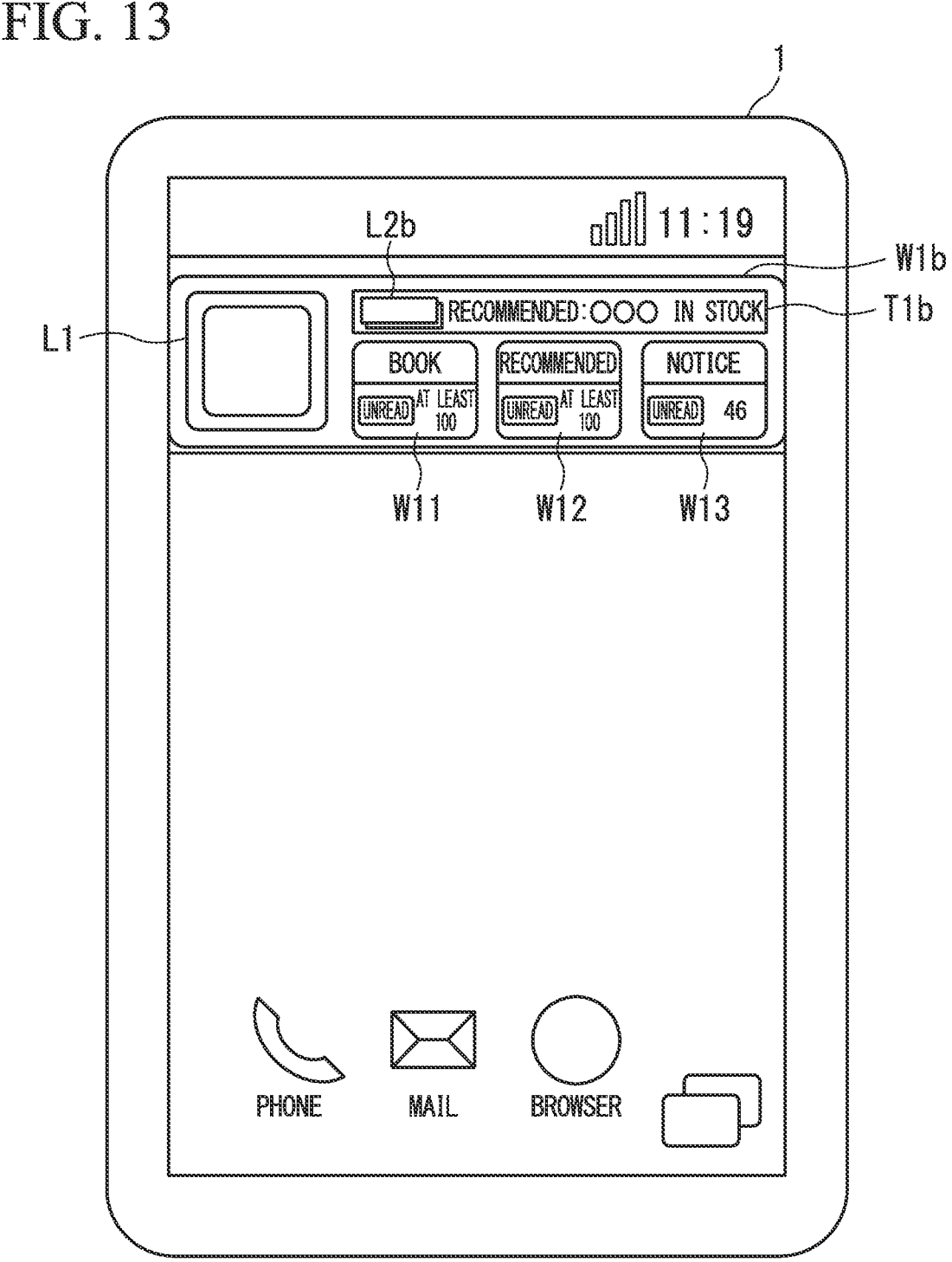
FIG. 13 is a schematic diagram illustrating an example of a display of the electronic terminal device according to modified example 1 of the first embodiment.

FIG. 13 is a schematic diagram illustrating an example of a display of an electronic terminal device 1 according to a modified example 1 of the first embodiment.

If a widget W1b shown in FIG. 13 is compared to the widget W1 shown in FIG. 2, the difference is in that the widget W1b includes a telop display unit T1b. The telop display unit T1b displays a character string, such as an advertisement, which is delivered from the store server 4. This character string is a character string including characters, the number of which is less than or equal to a predetermined number (such as 200 characters). The character string is displayed in a looped manner in the telop display unit T1b. Here, in a case where the character string cannot be received from the store server 4, or in a case where the character string received from the store server 4 will not have been updated for a predetermined period (such as one week), the electronic terminal device 1 may display the widget W1 shown in FIG. 2 without displaying the telop display unit T1b.

In FIG. 13, a logo L2b is displayed in the telop display unit T1b. Here, in a case where the logo L2b is selected, the electronic terminal device 1 displays the store page P11.
(Second Embodiment)

Hereinafter, a second embodiment of the present invention is explained in detail with reference to drawings.

Figure 14:
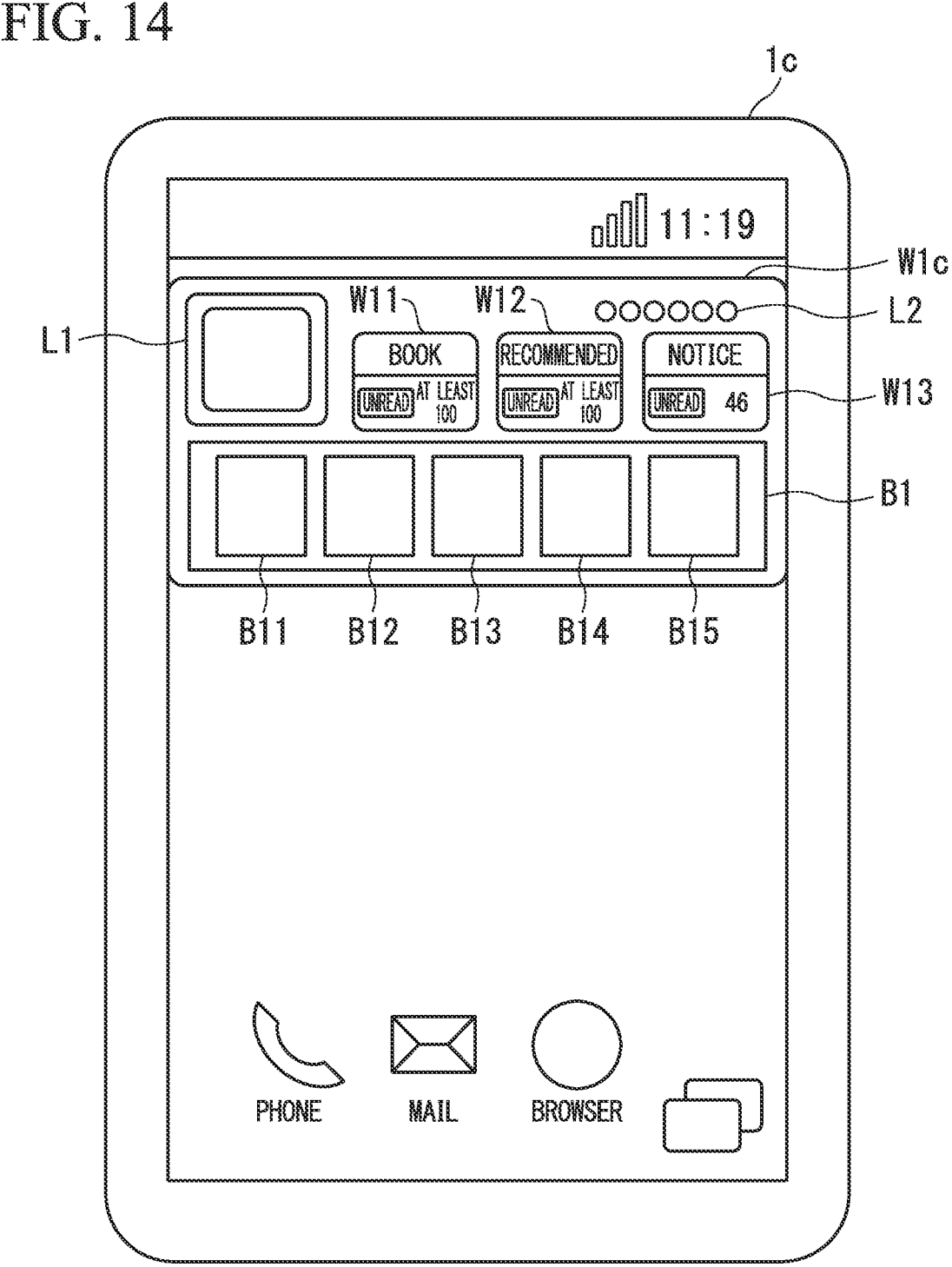
FIG. 14 is a schematic diagram illustrating a display of an electronic terminal device according to a second embodiment of the present invention.

FIG. 14 is a schematic diagram illustrating a display of an electronic terminal device 1c according to a second embodiment of the present invention. If a widget W1c shown in FIG. 14 is compared to the widget W1 shown in FIG. 2, the difference is in that the widget W1c includes a thumbnail image display unit B1.

In the thumbnail image display unit B1, thumbnail images B11 to B15 of electronic books are displayed in this order. Here, the thumbnail images displayed in the thumbnail image display unit B1 are thumbnail images of unread electronic books. In a case where there are five or more thumbnail images, the thumbnail images can be scrolled in the thumbnail image display unit B1. Here, the widget W1 has the size of 4 (horizontal)×2 (vertical).

Figure 15:
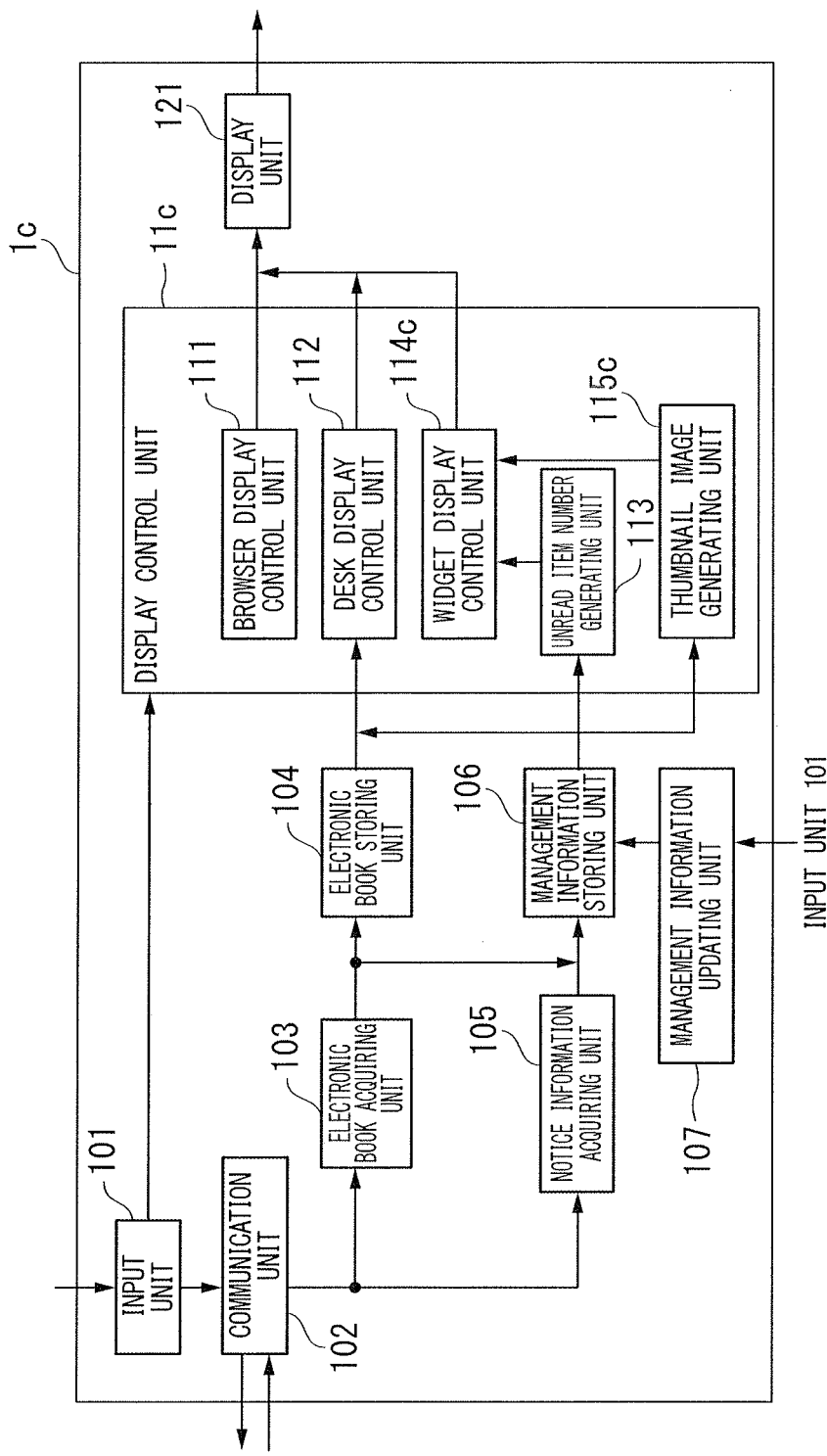
FIG. 15 is a schematic block diagram illustrating a configuration of the electronic terminal device according to the second embodiment.

FIG. 15 is a schematic block diagram illustrating a configuration of the electronic terminal device 1c according to the second embodiment. In FIG. 15, the electronic terminal device 1c includes: the input unit 101; the communication unit 102; the electronic book acquiring unit 103; the electronic book storing unit 104; the notice information acquiring unit 105; the management information storing unit 106; the management information updating unit 107; a display control unit 11c; and a display unit 121. If the electronic terminal device 1c (FIG. 15) is compared to the electronic terminal device 1 (FIG. 6), the difference is in that the electronic terminal device 1c includes a thumbnail image generating unit 115c.

The thumbnail image generating unit 115c arranges thumbnail images, and generates display information for displaying the thumbnail images in the arranged order. Specifically, the thumbnail image generating unit 115c arranges the thumbnail images in any one of the following order, or in combination of the following orders.

(1) order of thumbnail images to be displayed on the desk page or the store page (2) order according to the downloaded date, followed by the published date, and the purchased date (3) order according to group information In a case where thumbnail images are displayed in the above order (1), the management information storing unit 106 stores in a display order table, display order information that associates the book ID with the display order. For example, the desk display control unit 112 stores in the display order table, display order information indicating the display order in a case where a list (second list) is displayed on the desk page. Additionally, for example, the electronic book acquiring unit 103 and the notice information acquiring unit 105 store in the display order table, display order information indicating the display order in a case where a list (second list) is displayed on the store page.

The thumbnail image generating unit 115c arranges thumbnail images of unread electronic books based on the information stored in the management information storing unit 106. In other words, the thumbnail image generating unit 115c arranges thumbnail images of unread electronic books in order of the thumbnail images to be displayed in the shelf displayed on the desk page or the store page.

In a case where the thumbnail images are displayed in the above order (2), based on the information stored in the management information storing unit 106, the thumbnail image generating unit 115c arranges thumbnail images of unread electronic books in order according to the downloaded date, followed by the published date, and the purchased date, such that the latest date is arranged first. Here, the present invention is not limited thereto, the thumbnail image generating unit 115c may arranges thumbnail images of unread electronic books in order according to the downloaded date, followed by the published date, and the purchased date, such that the oldest date is arranged first.

In a case where the thumbnail images are displayed in the above order (3), based on the information stored in the management information storing unit 106, the thumbnail image generating unit 115c arranges thumbnail images of unread electronic books in a predetermined order of groups. The order of groups may be such that "BOOK" is first, followed by the "RECOMMENDED", or such that "RECOMMENDED" is first, followed by "BOOK". Here, "BOOK" means electronic books purchased by a user and electronic books subscribed and acquired by a user. On the other hand, "RECOMMENDED" means electronic books transmitted from the store server 4 free of charge. However, a grouping method is not limited thereto.

Additionally, the thumbnail image generating unit 115c may determine the order of groups in accordance with the use history of a user as in the following (a) to (c).
(a) Order According to Downloaded Date For example, the thumbnail image generating unit 115c may determine the order of groups so as to prioritize a group including an electronic book whose downloaded date (or the published date, or the purchased date) is new. For example, regarding the book management information shown in FIGS. 7 and 8, the thumbnail image generating unit 115c determines the order of groups such that the group "BOOK" including the electronic book (book ID "12345") associated with the latest downloaded date "2011, Apr. 20" is the first, and the group "RECOMMENDED" including the electronic book associated with the second latest downloaded date "2011, Apr. 18" is the second.

(b) Order According to Number of Unread Items or Number of Books

For example, the thumbnail image generating unit 115c may determine the order of groups so as to prioritize a group including a greater number of unread books. Thus, it is possible to increase the opportunity of referring to electronic books belonging to a group including a great number of unread books. However, the present invention is not limited thereto, and the thumbnail image generating unit 115c may determine the order of groups so as to prioritize a group including a smaller number of unread books. Thus, it is possible make it easier for a user to refer to a group including a small number of unread books, that is, a group that the user uses many times.

Additionally, the thumbnail image generating unit 115c may determine the order of groups based on the number of books, instead of the number of unread books. In other words, the thumbnail image generating unit 115c may determine the order of groups based on the total number of unread and already-read electronic books.

(c) Order According to Number of Times Read or Total Amount of Reading Time

For example, the thumbnail image generating unit 115c may determine the order of groups so as to prioritize a group for which the total value of the number of times read and the total amount of reading time is greater. However, the present invention is not limited thereto, and the thumbnail image generating unit 115c may determine the order of groups so as to prioritize a group for which the total value of the number of times read and the total amount of reading time is smaller.

Figure 16:
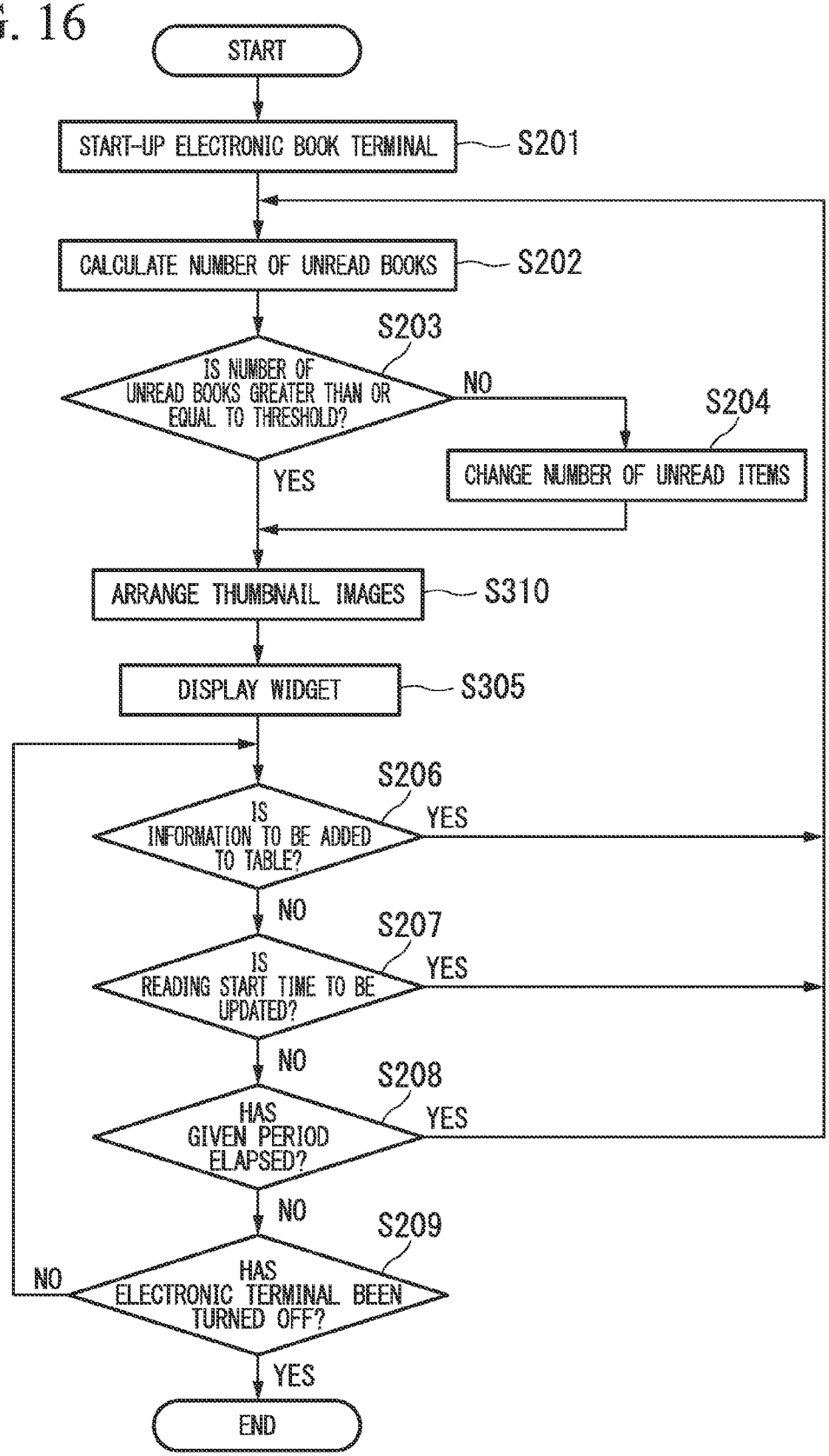
FIG. 16 is a flowchart illustrating an example of operation of the electronic terminal device according to the second embodiment.

FIG. 16 is a flowchart illustrating an example of operation of the electronic terminal device 1c according to the second embodiment. If operation of the electronic terminal device 1c (FIG. 16) is compared to the operation of the electronic terminal device 1 (FIG. 11), the difference is in that the operation of the electronic terminal device 1c includes steps S310 and S305.

(Step S310) The thumbnail image generating unit 115c arranges the thumbnail images in the above orders (1) to (3). Here, the thumbnail image generating unit 115c subjects to an arrangement, items for which the current time is in the period from the validity period start date to the validity period end time. Then, the operation proceeds to step S305.

(Step S305) The widget display control unit 114 displays the widget W1c.

Thus, according to the second embodiment, the display unit 121 displays a list of thumbnail images (first list) representing unread electronic books. Thus, the electronic terminal device 1c can display thumbnail images of unread electronic books, thereby enabling a user to conveniently use electronic book services.

Additionally, according to the second embodiment, the display control unit 11c (thumbnail image generating unit 115c) determines the order of images to be displayed in the thumbnail image display unit B1, based on the order of images in the list displayed on the desk page or the store page. Thus, even in a case where the desk page or the store page is minimized, the electronic terminal device 1c can display a list of images in the same order as the order of thumbnails images displayed in the widget W1c. Thus, the electronic terminal device 1c can provide smooth services to a user. For example, the electronic terminal device 1c can prevent a case where electronic books associated with the thumbnail images displayed in the widget W1c are not displayed in the list on the desk page or the store page, and the user cannot use the services smoothly.

Additionally, according to the second embodiment, the display control unit 11c determines the order of images to be displayed on the thumbnail image display unit B1, based on the group to which electronic book belong. The display unit 121 displays a list of thumbnail images in the display order determined by the display control unit 11c. Thus, the electronic terminal device 1c can preferentially display a list of thumbnail images belonging to a group with the higher priority.

MODIFIED EXAMPLE 2

Here, in the second embodiment, the electronic terminal device 1c may allocate to each group, a display region of the thumbnail image display unit B1.

Figure 17:
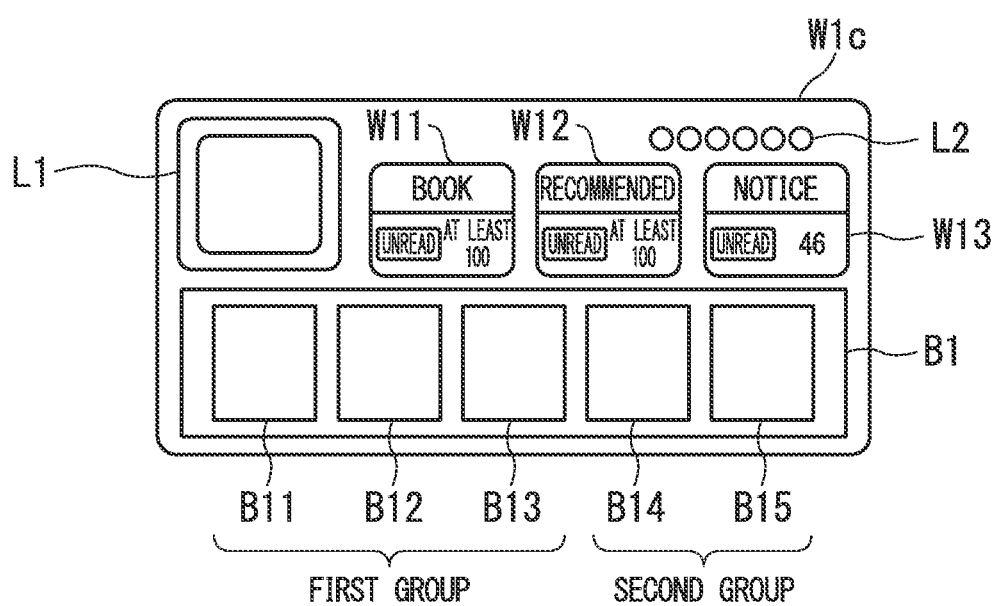
FIG. 17 is a schematic diagram illustrating a display of the electronic terminal device according to modified example 2 of the second embodiment.

FIG. 17 is a schematic diagram illustrating an example of a display of the electronic terminal device 1c according to modified example 2 of the second embodiment. In the widget W1c shown in FIG. 17, the display regions of the thumbnail images B11 to B13 are allocated to the first group. Additionally, in the widget W1c, the display regions of the thumbnail images B14 and B15 are allocated to the second group. For example, the first group is the group "BOOK", and the second group is the group "RECOMMENDED".

Specifically, the thumbnail image generating unit 115c retrieves, for each group, thumbnail images of unread electronic books arranged in the display order. The thumbnail image generating unit 115c selects a predetermined number of thumbnail images in the arranged order, the predetermined number being predetermined for each group. The thumbnail image generating unit 115c generates display information for displaying the selected thumbnail images in a predetermined display region.

Additionally, the thumbnail image generating unit 115c may determine the order in a display region and the size of the display region (the vertical width, the horizontal width, a ratio, and the like) in accordance with the user history of the user as in the following (d) to (f).

(d) Order According to Downloaded Date

For example, the thumbnail image generating unit 115c may determine the order of groups or the size of a display region so as to prioritize a group including an electronic book whose downloaded date (or published date, or purchased date) is newer. For example, regarding the book management information shown in FIGS. 7 and 8, the thumbnail image generating unit 115c displays in the leftmost region, thumbnail images of the electronic books belonging to the group "BOOK", and constitutes the display region to include three thumbnail images. In this case, the thumbnail image generating unit 115c displays in the second region from the left, thumbnail images of electronic books belonging to the group "RECOMMENDED", and constitutes the display region to include two thumbnail images. In other words, the thumbnail image generating unit 115c displays in a larger and more leftward region, thumbnail images of electronic books belonging to a group with the higher priority.

(e) Order According to Number of Unread Items or Number of Books

For example, the thumbnail image generating unit 115c may determine the order of groups or the size of a display region so as to prioritize a group including a greater number of unread electronic books. However, the present invention is not limited thereto, and the thumbnail image generating unit 115c may determine the order of groups or the size of a display region so as to prioritize a group including a smaller number of unread electronic books.

(f) Order According to Number of Times Read or Total Amount of Reading Time

For example, the thumbnail image generating unit 115c may determine the order of groups or the size of a display region so as to prioritize a group for which the number of times read and the total amount of reading time are greater. However, the present invention is not limited thereto, and the thumbnail image generating unit 115c may determine the order of groups or the size of a display region so as to prioritize a group for which the number of times read and the total amount of reading time are smaller.

Thus, according to modified example 2, the display control unit 11c determines a display region of an image in the thumbnail image display unit B1, based on the group to which an electronic book belongs. The display unit 121 displays a list of thumbnail images in the display order determined by the display control unit 11c. Thus, the electronic terminal device 1c can preferentially display a list of thumbnail images belonging to a group with the higher priority. Additionally, the electronic terminal device 1c can allocate the display region to, for example, even a group with a lower priority, thereby increasing the number of groups to be displayed.

Here, part of the display devices 1 and 1c according to the above embodiments may be implemented by a computer. In this case, a computer-readable recording medium may store a program for implementing the control functions. Then, a computer system reads and executes the program, thereby performing the above control functions. Here, the computer system is a computer system built in the display devices 1 and 1c and includes an OS and hardware such as a peripheral equipment. Further, the "computer-readable recording medium" refers to a storage unit such as portable media like a flexible disk, a magneto-optical disk, a ROM, or a CD-ROM, and a hard disk built in the computer system. Moreover, the "computer-readable recording medium" may also include: a medium which stores a program dynamically and temporarily, such as a communication line when the program is transmitted via a network such as the Internet or a communication line such as a telephone line; and a medium which stores the program for a certain period of time, such as a volatile memory included in a computer system functioning as a server and a client in that case. Additionally, the aforementioned program may be a program which implements part of the aforementioned functions, or a program which may implement the aforementioned functions in combination of another program already stored in the computer system.

Further, part or all of the display devices 1 and 1c according to the above embodiments may be implemented as an integrated circuit, such as an LSI (large scale integration). Each functional block of the display devices 1 and 1c may be individually made as a processor. Alternatively, part of all of the functional blocks may be integrated to make a processor. Moreover, the circuit integration method is not limited to the LSI, but may be implemented as a dedicated circuit or a general-purpose processor. Additionally, if a circuit integration technology substituting the LSI is invented along with the progress of the semiconductor technology, an integrated circuit made by that technology may be used.

Although an embodiment of the present invention has been explained in detail with reference to the drawings, the specific configuration is not limited thereto, and various design modifications may be made without departing from the scope of the present invention.

INDUSTRIAL APPLICABILITY

The present invention is applicable to cellular phones, electronic book devices, and the like.

DESCRIPTION OF REFERENCE SYMBOLS 1, 1c: electronic terminal device (display device)
2: base station device
3: network
4: store server
101: input unit
102: communication unit
103: electronic book acquiring unit
104: electronic book storing unit
105: notice information acquiring unit
106: management information storing unit
107: management information updating unit
11, 11c: display control unit
121: display unit
111: browser display control unit
112: desk display control unit
113: unread item number generating unit
114: widget display control unit
115c: thumbnail image generating unit

The invention claimed is:
1. A display device comprising:
a display unit:
a management information storing unit which stores first information in a case that at least one first electronic book exists, the at least one first electronic book being identified by respective identifying information, the identifying information being included in identifying information for at least one second electronic book, the first information indicating that the at least one first electronic, book has not been read by a user, the at least one second electronic, book having been read or not read by the user; and
a display control unit configured to control whether or not to make the display unit display an application by running the application, the application being for making the display unit display the at least one second electronic book,
wherein the display control unit is configured to display the application at a first region of the display unit in a ease that the display control unit makes the display unit display the application,
wherein the display control unit is configured to display second information at a second region of the display unit without making the display unit display any content of the at least one second electronic book, in a case that both of first and second conditions are satisfied, the first condition being that the display control unit does not make the display unit display the application, the second condition being that the management information storing unit has stored the first information, wherein the second information indicates that the at least one first electronic book exists, and wherein the second region is smaller than the first region.

2. The display device according to claim 1, wherein the display unit is configured to simultaneously display third information and fourth information, the third information indicating that a first group including at least one third electronic book included in the at least one first electronic book is present, the fourth information indicating that a second group including at least one fourth electronic book included in the at least one first electronic book is present.

3. The display device according to claim 1, wherein the display unit is configured to display, as the second information, a number or an image, the number being of unread items indicating a number of the at least one first electronic book, the image indicating that the at least one first electronic book is present.

4. The display device according to claim 1, wherein the display unit is configured to display, in a case that a number of the at least one first electronic book is greater than a predetermined value, third information, the third information indicating that the number is greater than the predetermined value.

5. The display device according to claim 1, wherein the display unit is configured to display a first list of first images indicating the at least one first electronic book.

6. The display device according to claim 5, wherein the display unit is configured to display a second list of second images indicating the at least one second electronic book,
the display control unit is configured to determine a first display order of the first images, the determination being performed based on a second display order of the second images, and
the display unit is configured to display the first list in the first display order determined by the display control unit.

7. The display device according to claim 5, wherein
the display control unit is configured to determine a first display order of the first images, the determination being performed based on groups, to which the at least one first electronic book belongs, and
the display unit is configured to display the first list in the first display order determined by the display control unit.

8. The display device according to claim 6 further comprising:
a display region control unit configured to determine a display region for the first images, the determination of the display region being performed based on groups to which the at least one first electronic book belongs,
wherein the display unit is configured to display the first list in the display region determined by the display region control unit.

9. The display device according to claim 1, wherein the display control unit is configured to make the display unit display, as the second information, a button for booting the application, and for making the display unit display the application.

10. The display device according to claim 1, wherein the display control unit is configured to display, as the second information, a number of unread items indicating a number or image, the number being of at least one third electronic book during a validity period among the at least one first electronic hook, the image indicating that the at least one third electronic book is present.

11. The display device according to claim 2, further comprising:

a thumbnail image generating unit configured to determine a displaying order of the third information and the fourth information such that the third information is prioritized to the fourth information,
wherein the at least one third electronic book is with one of a download date, published date and a purchased date newer than that of the at least one fourth electronic book.

12. The display device according to claim 11, wherein
the display unit is configured to display the third information and the fourth information such that the third information is larger than the fourth information.

13. The display device according to claim 2, further comprising:
a thumbnail image generating unit configured to determine a displaying order of the third information and the fourth information based on a first number and a second number, the first number being of the at least one third electronic book, the second number being of the at least one fourth electronic hook.

14. The display device according to claim 13, wherein
the display unit is configured to display the third information and the fourth information such that the third information is larger than the fourth information.

15. The display device according to claim 2, further comprising:
a thumbnail image generating unit configured to determine a displaying order of the third information and the fourth information such that the third information is prioritized to the fourth information,
wherein the at least one third electronic book is with one of a number of times read and a total amount of reading time greater than that of the at least one fourth electronic book.

16. The display device according to claim 15, wherein
the display unit is configured to display the third information and the fourth information such that the third information is larger than the fourth information.

17. A display method for a display device, the display method comprising:
storing, by the display device, first information in a case that at least one first electronic book exists, the at least one first electronic book being identified by respective identifying information, the identifying information being included in identifying information for at least one second electronic book, the first information indicating that the at least one first electronic book has not been read by a user, the at least one second electronic book having been read or not read by the user;
controlling, by the display device, her. or not to make a display unit of the display device display an application by running the application, the application being for making the display unit display the at least one second electronic book;
displaying, by the display device, the application at a first region of the display unit in a case that the display device makes the display unit display the application,
wherein the display device makes the display unit display second information at a second region of the display unit without making the display unit display any content of the at least one second electronic book, in a case that both of first and second conditions are satisfied, the first condition being that the display device does not make the display unit display the application, the second condition being that the display device has stored the first information, wherein the second information indicates that the at least one first electronic book exists, and wherein the second region is smaller than the first region.

18. A non-transitory computer-readable recording medium storing a display program to cause a computer of a display device to execute:

storing, by the display device, first information in a case that at least one first electronic book exists, the at least one first electronic book being identified by respective identifying information, the identifying information being included in identifying information for at least one second electronic book, the first information indicating that the at least one first electronic book has not been read by a user, the at least one second electronic book having been read or not read by the user;

controlling, by the display device, whether or not to make a display unit of the display device display an application by running the application, the application being for making the display unit display the at least one second electronic book; and displaying, by the display device, the application at a first region of the display unit in a case that the display device makes the display unit display the application, wherein the display program makes the display unit display second information at a second region of the display unit without making the display unit display any content of the at least one second electronic book, in a case that both of first and second conditions are satisfied, the first condition being that the display device does not make the display unit display the application, the second condition being that the display device has stored the first information, wherein the second information indicates that the at least one first electronic book exists, and wherein the second region is smaller than the first region.

* * * * *